US012286308B2

(12) United States Patent
Meier

(10) Patent No.: US 12,286,308 B2
(45) Date of Patent: Apr. 29, 2025

(54) TRANSPORT SYSTEM FOR CONTAINERS IN THE BEVERAGE INDUSTRY AND LUBRICATION METHOD

(71) Applicant: KRONES AG

(72) Inventor: Matthias Meier, Saal a.d. Donau (DE)

(73) Assignee: KRONES AG, Neutraubling (DE)

( * ) Notice: Subject to any disclaimer, the term of this patent is extended or adjusted under 35 U.S.C. 154(b) by 922 days.

(21) Appl. No.: 16/768,022

(22) PCT Filed: Nov. 21, 2018

(86) PCT No.: PCT/EP2018/082032
§ 371 (c)(1),
(2) Date: May 28, 2020

(87) PCT Pub. No.: WO2019/105820
PCT Pub. Date: Jun. 6, 2019

(65) Prior Publication Data
US 2020/0361715 A1 Nov. 19, 2020

(30) Foreign Application Priority Data
Nov. 29, 2017 (DE) ...................... 10 2017 221 397.3

(51) Int. Cl.
*B65G 45/02* (2006.01)
*B25J 5/00* (2006.01)
(Continued)

(52) U.S. Cl.
CPC .............. *B65G 45/02* (2013.01); *B25J 5/007* (2013.01); *B25J 15/0019* (2013.01); *B25J 19/02* (2013.01);
(Continued)

(58) Field of Classification Search
CPC .......... F16N 2210/24; F16N 7/38; F16N 9/00; B65G 2201/0244
(Continued)

(56) References Cited

U.S. PATENT DOCUMENTS

| 2010/0106298 A1* | 4/2010 | Hernandez | G05D 1/0221 |
| | | | 700/250 |
| 2016/0041557 A1* | 2/2016 | Trout | G01C 21/206 |
| | | | 701/25 |

(Continued)

FOREIGN PATENT DOCUMENTS

| CN | 105214876 A | 1/2016 |
| CN | 105612115 A | 5/2016 |

(Continued)

OTHER PUBLICATIONS

China National Intellectual Property Administration, Office Action and Search Report Issued in Application No. 201880077065.2, Feb. 3, 2021, 17 pages. (Submitted with Partial Translation).

(Continued)

*Primary Examiner* — Henry Y Liu
*Assistant Examiner* — Mark K Buse
(74) *Attorney, Agent, or Firm* — McCoy Russell LLP

(57) ABSTRACT

A transport system for containers in the beverage industry, with a first container conveyor including a conveyor belt for conveying the containers, and a lubrication system including an applicator for applying a lubricant to the conveyor belt of the first container conveyor, wherein the transport system comprises a second container conveyor with a further conveyor belt for conveying the containers, and the lubrication system includes a mobile robot which has the applicator arranged thereon and a floor-supported undercarriage, for applying the lubricant in an automated selectively to the (Continued)

conveyor belt of the first container transporter or the conveyor belt of the second container conveyor.

18 Claims, 1 Drawing Sheet

(51) Int. Cl.
  *B25J 15/00*  (2006.01)
  *B25J 19/02*  (2006.01)
  *F16N 7/38*  (2006.01)
  *F16N 9/00*  (2006.01)

(52) U.S. Cl.
  CPC .............. *F16N 7/38* (2013.01); *F16N 9/00* (2013.01); *B65G 2201/0244* (2013.01); *B65G 2203/0266* (2013.01); *F16N 2210/24* (2013.01)

(58) Field of Classification Search
  USPC ........................................ 184/15.2
  See application file for complete search history.

(56) References Cited

U.S. PATENT DOCUMENTS

| | | | |
|---|---|---|---|
| 2016/0176648 A1* | 6/2016 | Van Den Berg | B65G 45/10 198/340 |
| 2018/0135802 A1* | 5/2018 | Shafer | F16N 19/003 |
| 2018/0156384 A1* | 6/2018 | Yamane | B25J 13/08 |
| 2019/0261565 A1* | 8/2019 | Robertson | A01D 46/253 |

FOREIGN PATENT DOCUMENTS

| | | |
|---|---|---|
| CN | 106516650 A | 3/2017 |
| DE | 102014105894 A1 | 10/2015 |
| JP | H10221239 A | 8/1998 |
| JP | H11246029 A | 9/1999 |
| JP | 2010047397 A | 3/2010 |
| WO | 2017033380 A1 | 3/2017 |

OTHER PUBLICATIONS

ISA European Patent Office, International Search Report Issued in Application No. PCT/EP2018/082032, Feb. 1, 2019, WIPO, 6 pages.

* cited by examiner

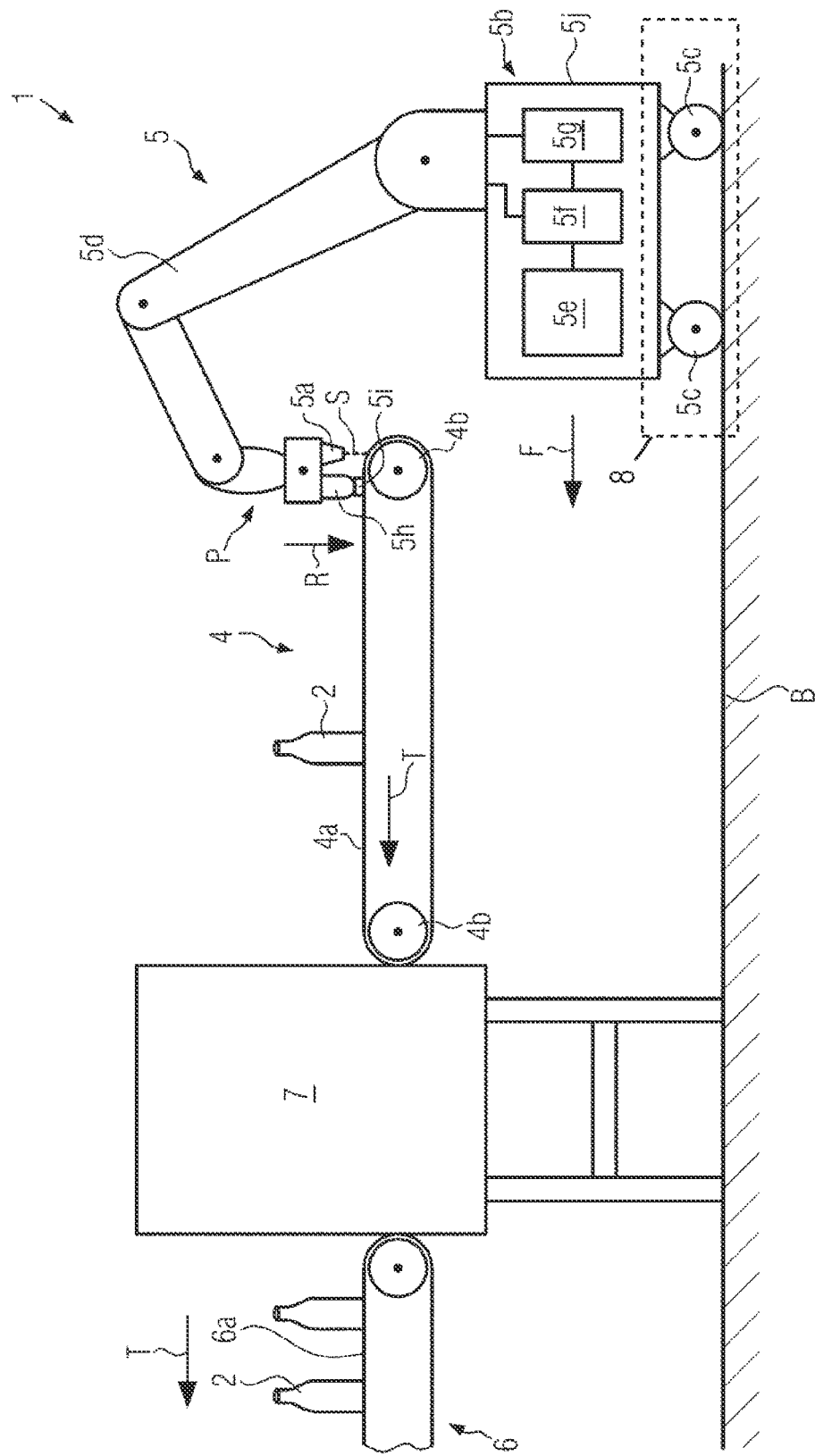

TRANSPORT SYSTEM FOR CONTAINERS IN THE BEVERAGE INDUSTRY AND LUBRICATION METHOD

CROSS-REFERENCE TO RELATED APPLICATIONS

The present application is a U.S. National Phase of International Patent Application Serial No. PCT/EP2018/082032 entitled "TRANSPORT SYSTEM FOR CONTAINERS IN THE BEVERAGE INDUSTRY AND LUBRICATION METHOD," filed on Nov. 21, 2018. International Patent Application Serial No. PCT/EP2018/082032 claims priority to German Patent Application No. 10 2017 221 397.3 filed on Nov. 29, 2017. The entire contents of each of the above-referenced applications are hereby incorporated by reference for all purposes.

TECHNICAL FIELD

The present invention relates to a transport system for containers in the beverage industry and a lubrication method therefor.

BACKGROUND AND SUMMARY

In order to achieve this object, the present invention provides a transport system.

Such container conveyors include conveyor belts on which the containers are transported upright. In certain areas of the transport system the containers are additionally guided by guide elements in the area of the conveyor belts, so as to singulate them from a wide into a narrow flow of containers, by way of example. It is also imaginable to guide the containers around a curve by means of guide elements. This, however, necessitates that the containers slide on the conveyor belts, since the guide elements also move them transversely to the conveying direction. It is therefore desirable that the conveyor belts have a defined coefficient of friction, since otherwise tipping of the containers might occasionally be caused by the guide elements.

In order to keep the coefficient of friction at a suitable value, it is known to install at the conveyor fixed applicators with nozzles that apply the lubricant to the conveyor belt at suitable intervals. This is disadvantageous insofar as the applicators have to be provided with fixed pipes or hoses, and this results in a complicated installation and start-up procedure of the lubrication system. Moreover, the lubricant is applied equally to all areas of the conveyor belt without checking the actual demand and, as long as the container conveyor works properly, neither the coefficient of friction nor the dosage will be checked. It follows that, in rare cases, it may happen that the containers may not be transported reliably and fall over or, conversely, that the conveyor belt may be lubricated to an excessive extent.

Therefore, it is the object of the present invention to provide a transport system for containers in the beverage industry, which allows less complicated but nevertheless more reliable lubrication of the conveyor belts of container conveyors.

In order to achieve this object, the present invention provides a transport system having the features of claim 1. Advantageous embodiments are specified in the subclaims.

Due to the fact that the lubrication system includes the mobile robot, which has the applicator arranged thereon and the floor-supported undercarriage, the mobile robot can be moved on the floor of the plant to arbitrary positions so as to reliably lubricate the conveyor belts of a plurality of container conveyors by means of the applicator. In addition, the mobile robot can be automated as required for moving autonomously to the container conveyors and distributing, by the applicator arranged thereon, the lubricant to the conveyor belts. Hence, the lubrication system with the mobile robot does not require any intervention on the part of the user for carrying out the lubrication and requires thus particularly little outlay.

The transport system may be arranged in a beverage processing plant. The transport system may be assigned to a container manufacturing facility (e.g. a stretch blow molder), a rinser, a sorting machine, an empty bottle inspection machine, a full bottle inspection machine, a filler, a capper and/or a packaging machine. Preferably, the container conveyors of the transport system may be configured to transport the containers between the aforementioned units. For example, the first container conveyor may be arranged between the rinser and the filler and the second container conveyor between the filler and the capper. Another example would be an arrangement between a filler with downstream capper and a labeler. In general, it is imaginable to arrange the conveyor system between all known parts of a beverage processing plant.

The containers may be intended to receive therein beverages, food, hygiene articles, pastes, chemical, biological and/or pharmaceutical products. The containers may be plastic bottles, glass bottles, cans and/or tubes. Plastic containers may especially be PET, PEN, HD-PE or PP containers or bottles. Likewise, they may also be biodegradable containers or bottles whose main components consist of renewable raw materials, such as sugar cane, wheat or corn. The containers may each include a closure head.

The conveyor belts of the first and/or second container conveyor may be link conveyor chains or flexible plastic belts. The conveyor belt of the second container conveyor may be of a belt type different from that of the conveyor belt of the first container conveyor. The first and/or second container conveyor may include drive and/or deflection rollers to drive and/or guide the conveyor belt.

The lubricant may preferably be a dry lubricant. In particular, it may be an $MoS_2$ or PTFE lubricant. Dry lubricants are generally understood to be lubricants that are used without using water in addition. The lubricant is therefore applied "in a pure condition" and not previously diluted.

The floor-supported undercarriage of the mobile robot may be steerable, so that it will be able to move along curved paths of movement on a floor. "Floor-supported undercarriage" may here mean that the undercarriage travels directly on a floor on which the transport system and/or the beverage processing plant is installed. The floor-supported undercarriage may in particular include wheels, rollers, track and/or crawler chains 8. "Floor-supported" may also mean support by means of air under pressure ("air cushion"). Preferably, the floor may be the floor of a building.

The mobile robot may include a control unit for controlling the floor-supported undercarriage, an articulated arm described hereinafter, the friction coefficient measuring device described below and/or the applicator. The control unit may be a machine control, by way of example. The control unit may comprise a CPU, a speech unit, a data interface, an input unit (for example a keyboard) and/or an output unit (for example a screen). Likewise, the mobile robot may be configured to move autonomously in the transport system on the basis of a work instruction. The mobile robot may also be configured to autonomously move, on the basis of the work instruction, the applicator and/or the articulated arm for applying the lubricant. "Work instruction" may here mean e.g. intervals for applying the lubricant, an arrangement of the first and second container conveyors and/or paths of movement for the mobile robot on the floor.

The mobile robot may include the controllable articulated arm for the applicator, so as to move the applicator relative to the first and second container conveyors in various application directions and/or to various application positions. This allows the position and orientation of the applicator to be adapted in a particularly flexible manner to the arrangement of the conveyor belts. A "controllable articulated arm" may here mean an arm with at least one controllable joint or a robot arm. The at least one controllable joint may here mean at least one joint that is adjustable by means of at least one actuator, in particular an electric motor or a hydraulic unit, on the basis of control signals. Preferably, the controllable articulated arm may comprise six controllable joints for moving the applicator in arbitrary application directions and to arbitrary application positions. The mobile robot with the controllable articulated arm may, for example, be a system of the KUKA KMR iiwa type. The controllable articulated arm may be connected to the control unit for movement in the application directions and/or to the application positions.

The applicator may include at least one nozzle for distributing the lubricant on the conveyor belts of the first and second container conveyors. This allows the lubricant to be applied to the conveyor belts in a particularly homogeneous manner. The application through the applicator is here preferably carried out at the upstream deflection of the conveyor belts, in particular in an area in which containers cannot arrive, e.g. when the area is kept away from this area by a railing spaced apart from the conveyor belt in a vertical direction. This prevents the articulated arm from coming into contact with the containers and thus from having a negative influence on them (tipping over, damage, . . . ). In addition to the nozzle, the applicator may also include a brush for applying the lubricant to the conveyor belt. In this case, the nozzle is used for dosing the lubricant.

The lubrication system may include a storage tank and/or a feed pump for the lubricant, which are arranged on the mobile robot. A particularly large supply of lubricant can thus be carried along with the mobile robot.

The lubrication system may include a friction coefficient measuring device arranged on the mobile robot and used for ascertaining a friction coefficient of the conveyor belts of the first and second container conveyors. In this way, the friction coefficients of the conveyor belts can be measured first, and the lubricant can be applied only if necessary, thus making the lubrication system particularly reliable. Preferably, the lubricant may not be applied until the conveyor belts exceed a respective nominal friction coefficient of 0.15, preferably 0.1, further preferred of 0.08. The coefficient of friction may be a ratio of a friction force of a container standing on the conveyor belt and held in place along the conveying direction and a weight force of the container. The friction force may be a force along the conveying direction exerted by the moving conveyor belt on the container bottom when the container is held in place.

The friction coefficient measuring device may include a contact element arranged on the controllable articulated arm, the controllable articulated arm and/or the friction coefficient measuring device being configured to press the contact element with a predetermined force against the respective conveyor belts of the first and second container conveyors. In this way, the friction coefficient can be ascertained particularly easily. What is meant here is that the contact element can be pressed selectively against the conveyor belt of the first container conveyor or against the conveyor belt of the second container conveyor by means of the articulated arm and/or by moving the mobile robot. The contact element of the friction coefficient measuring device may also be pressed onto the respective conveyor belt several times in succession at intervals of a few seconds, so as to subsequently calculate an average value from the at least two measurements.

The friction coefficient measuring device may communicate with a database, so as to retrieve therefrom nominal friction coefficients of various container types and/or determine the nominal friction coefficient on the basis of similar container types. In this way, particularly advantageous nominal friction coefficients for the different container types can be retrieved from the database in order to apply the lubricant on the basis of these coefficients.

The mobile robot may include a cleaning device. In this case, the friction coefficient measuring device, the lubricant applicator as well as the cleaning device may be used one after the other in any sequence. It is also imaginable that the friction coefficient is measured first, whereupon cleaning is carried out, whereupon the lubricant is applied and the friction coefficient is then measured once more. Cleaning is preferably carried out by means of a pressurized fluid, such as compressed air or water (having a cleaning agent added thereto, if necessary). However, it is also imaginable that the cleaning device is brought into direct mechanical contact with the surface of the conveyor.

In order to achieve the object specified, the present invention additionally provides, in claim 8, a lubrication method for a transport system for containers in the beverage industry. Advantageous embodiments are specified in the subclaims.

Due to the fact that the applicator is automatically moved by the mobile robot by means of the floor-supported undercarriage from the first container conveyor to the second container conveyor, the applicator can be used for reliably lubricating conveyor belts of a plurality of container conveyors. In addition, the mobile robot can be automated as required for moving autonomously to the container conveyors and distributing, by the applicator arranged thereon, the lubricant to the conveyor belts. Hence, the lubrication method with the mobile robot does not require any intervention on the part of the user for carrying out the lubrication and requires thus particularly little effort.

The lubrication method can be used for the above described transport system for containers in the beverage industry. The lubrication method may comprise, mutatis mutandis, the features described hereinbefore with respect to the transport system.

According to the lubrication method, an application direction and/or position of the applicator can be changed by means of a controllable articulated arm. In this way, the applicator can be oriented particularly well for lubricating the conveyor belts of the first and second container conveyors and can thus be used in a flexible manner.

According to the lubrication method, a contact element of a friction coefficient measuring device can be pressed against the conveyor belt of the first container conveyor and/or against the conveyor belt of the second container conveyor with a predetermined force, and at least one friction coefficient for the first and/or second container conveyor can be determined in this way, and on the basis of this friction coefficient it will be determined whether and/or, if so, when lubrication of the first and/or second container conveyor will be necessary. Lubrication can thus be reduced to the necessary extent so that excessive lubricant consumption will be avoided.

It is imaginable that friction coefficients for the conveyor belt of the first container conveyor and/or the second container conveyor are determined sectionwise with the contact element, the lubricant being applied, depending thereon, to the conveyor belt of the first container conveyor and/or the second container conveyor by the applicator with dosages varying from one section to the next. As a result, a particularly homogeneous distribution of the lubricant on the conveyor belts will be accomplished. "Sectionwise" means here preferably that the respective conveyor belt is subdivided into sections transversely to the transport direction.

BRIEF DESCRIPTION OF THE FIGURES

Further features and advantages of the present invention will be explained hereinafter in more detail on the basis of the embodiment shown in FIG. 1, in which:

FIG. 1 shows an embodiment of a transport system according to the present invention used for containers in the beverage industry.

DETAILED DESCRIPTION

FIG. 1 shows an embodiment of a transport system 1 according to the present invention used for containers 2 in the beverage industry. As can be seen, the containers 2, coming from the right, are conveyed by the first container conveyor 4 to the container treatment machine 7, e.g. to a filler with a capper. There, they are filled with a product, in the present example, and then conveyed via the second container conveyor 6 in the transport direction T to further container treatment machines, e.g. to a labeler.

The first container conveyor 4 includes the conveyor belt 4a, which is here configured e.g. as a link conveyor chain and which circulates over the two pulleys 4b. One of the two pulleys 4b is driven for imparting the transport movement T to the conveyor belt 4a.

In addition, the second container conveyor 6 can be seen, which is identical in construction to the container conveyor 4 in this embodiment and also includes a conveyor belt 6a configured as a link conveyor chain. However, it is also imaginable that the second container conveyor has a different structural design and is provided with a different type of conveyor belt.

In order to guarantee a homogeneous coefficient of friction of the two conveyor belts 4a, 6a, the lubrication system 5 is provided. The lubrication system 5 comprises the applicator 5a and the friction coefficient measuring device 5h, which are arranged on the controllable articulated arm 5d of the mobile robot 5b.

Making use of the floor-supported undercarriage 5c, the mobile robot 5b and the applicator 5a arranged thereon as well as the friction coefficient measuring device 5h can be moved along the floor B from the first container conveyor 4 to the second container conveyor 6. It is also imaginable that the transport system 1 comprises further container conveyors towards which the applicator 5a and the friction value measuring device 5h can be moved by means of the mobile robot 5b. In addition, the floor-supported undercarriage 5c is configured to be steerable so as to be also able to move in curves on the floor B.

It can also be seen that the mobile robot 5b includes the controllable articulated arm 5d for the applicator 5a and the friction value measuring device 5h, so as to move the applicator 5a relative to the first and second container conveyors 4, 6 in various application directions R and/or to various application positions P. This allows the lubricant S to be applied to the conveyor belts 4a, 6a in various directions and positions. The controllable articulated arm 5d comprises controllable joints for moving in the various application directions R and/or to the various application positions P.

The controllable articulated arm 5d is connected at its base to a box-like structure 5j having the floor-supported undercarriage 5c arranged on the lower end thereof. Inside the structure 5j, the storage tank 5e with a lubricant supply and the feed pump 5f, by means of which the lubricant S can be pumped from the supply tank 5e towards the applicator 5a, can be seen.

Inside the structure 5j, it is also possible to see the control unit 5g, with which the applicator 5a, the friction coefficient measuring device 5h described hereinafter, the articulated arm 5d, the floor-supported undercarriage 5c and the feed pump 5f are controlled. Making use of a suitable program and work instructions, it is possible for the lubrication system 5 to move, by means of the mobile robot 5b, autonomously on the floor B, e.g. in a direction along or opposite to the direction of movement F, and to apply the lubricant S to the container conveyors 4, 6.

In addition, it can be seen that the applicator 5a includes one or more nozzles for applying the lubricant S to the conveyor belts 4a, 6a. The applicator 5a may alternatively include a brush lubrication unit consisting of a brush for application to the conveyor belt and a nozzle for dosing the lubricant before it is applied. This allows the lubricant S to be applied in a particularly uniform manner.

In addition, the lubrication system 5 includes a friction coefficient measuring device 5h arranged on the mobile robot 5b and used for determining friction coefficients of the conveyor belts 4a, 6a of the first and second container conveyors 4, 6. To this end, the friction coefficient measuring device 5h includes the contact element 5i, which is arranged on the controllable articulated arm 5d. The controllable articulated arm 5d is configured to press the contact element 5i with a predetermined force selectively against the conveyor belts 4a, 6a of the first and second container conveyors 4, 6. In FIG. 1, the contact element 5i is just being pressed against the upper surface of the conveyor belt 4a.

Making use of the controllable articulated arm 5d, it is also possible to measure, via control currents for the controllable joints, forces acting on the articulated arm. It follows that the predetermined force acting perpendicularly on the conveyor belt 4a through the contact element 5i and corresponding e.g. to a weight force of the container 2 can be measured. On the other hand, also the friction force acting on the contact element 5i due to the conveying movement of the conveyor belt 4a in the direction T can be determined. The friction force can then be determined from the quotient of the two values.

It is also imaginable that the friction coefficient measuring device 5h includes suitable force sensors for measuring the friction force and the weight force on the contact element 5i.

The thus ascertained friction coefficient of the conveyor belt 4a of the first container conveyor 4 is then compared by the control unit 5g with a nominal friction coefficient for the container type of the containers 2, which is obtained from a database. If the ascertained coefficient of friction is above a nominal coefficient of friction, e.g. above 0.15, the lubricant S will be applied to the conveyor belt 4a by means of the applicator 5a.

Subsequently, the applicator 5a and the friction coefficient measuring device 5h are moved by the mobile robot 5b to the second container conveyor 6, where the friction coefficient of the conveyor belt 6a is determined. If also this friction coefficient is above the nominal coefficient of friction, the lubricant S will also here be applied to the conveyor belt 6a by means of the applicator 5a.

It is also imaginable that friction coefficients for the conveyor belts 4a, 6a of the first container conveyor 4 and of the second container conveyor 6 are determined sectionwise with the contact element 5i and that, depending thereon, the lubricant S is applied to the conveyor belts 4a, 6a by the applicator 5a with dosages varying from one section to the next. In this way, the two conveyor belts 4a, 6a are lubricated in a particularly homogeneous manner. It will be particularly advantageous to choose different dosages transversely to the conveying direction.

Due to the fact that the applicator 5a is automatically moved by the mobile robot 5b by means of the floor-supported undercarriage 5c from the first container conveyor 4 to the second container conveyor 6, the applicator 5a can be used for lubricating conveyor belts 4a, 6a of a plurality of container conveyors 4, 6. In addition, the mobile robot 5b can be automated as required for moving autonomously to the container conveyors 4, 6 and distributing, by the applicator 5a arranged thereon, the lubricant to the conveyor belts 4a, 6a. Hence, the lubrication system 5 with the mobile robot 5b does not require any intervention on the part of the user for carrying out the lubrication and requires thus particularly little outlay.

It goes without saying that the features described above with respect to the embodiment are not limited to this combination, but are also realizable individually or in any other combination.

The invention claimed is:

1. A transport system for containers in the beverage industry, with
   a first container conveyor including a conveyor belt for conveying the containers, and
   a lubrication system including an applicator for applying a lubricant to the conveyor belt of the first container conveyor,
   wherein
   the transport system comprises a second container conveyor with a further conveyor belt for conveying the containers,
   the lubrication system includes a mobile robot, wherein the mobile robot has the applicator arranged thereon and a floor-supported undercarriage for applying the lubricant in an automated manner selectively to the conveyor belt of the first container conveyor or the conveyor belt of the second container conveyor, and
   the mobile robot includes a control unit for controlling both the floor-supported undercarriage and the applicator, and wherein the mobile robot is configured to both move autonomously in the transport system via the floor-supported undercarriage and to autonomously move the applicator for applying the lubricant, wherein the lubrication system includes a friction coefficient measuring device arranged on the mobile robot and used for ascertaining a friction coefficient of the conveyor belts of the first and second container conveyors, wherein the friction coefficient measuring device communicates with a database for retrieving nominal friction coefficients of different container types therefrom and/or for determining the nominal friction coefficient on a basis of similar container types.

2. The transport system according to claim 1, wherein the mobile robot includes a controllable articulated arm for the applicator so as to move the applicator relative to the first and second container conveyors in various application directions and/or to various application positions.

3. The transport system according to claim 2, wherein a friction coefficient measuring device includes a contact element arranged on the controllable articulated arm and/or wherein the controllable articulated arm and/or the friction coefficient measuring device is configured to press the contact element with a predetermined force against the respective conveyor belts of the first and second container conveyors by using control currents for controllable joints of the articulated arm.

4. The transport system of claim 2, wherein the controllable articulated arm is connected at its base to a box-like structure, wherein the floor-supported undercarriage is arranged on a lower end of the box-like structure.

5. The transport system according to claim 1, wherein the applicator includes at least one nozzle for distributing the lubricant on the conveyor belts of the first and second container conveyors.

6. The transport system according to claim 1, wherein the lubrication system includes a storage tank and/or a feed pump for the lubricant, which are arranged on the mobile robot.

7. The transport system of claim 1, wherein the lubricant is a dry lubricant.

8. The transport system of claim 1, wherein the floor-supported undercarriage of the mobile robot is steerable, so that it can move along curved paths of movement on a floor.

9. The transport system of claim 1, wherein the floor-supported undercarriage includes wheels, rollers, track and/or crawler chains.

10. A lubrication method for a transport system for containers in the beverage industry, wherein the containers are conveyed with a conveyor belt of a first container conveyor, and wherein a lubricant is applied to the conveyor belt of the first container conveyor by means of an applicator of a lubrication system,
    wherein
    by means of a floor-supported undercarriage, the applicator is moved in an automated manner from the first container conveyor to a second container conveyor through a mobile robot, so as to apply the lubricant by the applicator to a conveyor belt of at least a second container conveyor, wherein the mobile robot includes a control unit for controlling both the floor-supported undercarriage and the applicator, and wherein the mobile robot is configured to both move autonomously in the transport system via the floor-supported undercarriage and to autonomously move the applicator for applying the lubricant, wherein the lubrication system includes a friction coefficient measuring device arranged on the mobile robot and used for ascertaining a friction coefficient of the conveyor belts of the first and second container conveyors, wherein the friction coefficient measuring device communicates with a database for retrieving nominal friction coefficients of different container types therefrom and/or for determining the nominal friction coefficient on a basis of similar container types.

11. The lubrication method according to claim 10, wherein an application direction and/or position of the applicator is changed by a controllable articulated arm.

12. The lubrication method according to claim 11, wherein a contact element of the friction coefficient measuring device is pressed against the conveyor belt of the first container conveyor and/or against the conveyor belt of the second container conveyor with a predetermined force, and at least one friction coefficient for the first and/or second container conveyor is determined in this way, and wherein it is determined on the basis of the at least one friction coefficient whether lubrication of the first and/or second container conveyor will be necessary.

13. The lubrication method according to claim 12, wherein friction coefficients for the conveyor belt of the first container conveyor and/or the second container conveyor are determined sectionwise with the contact element, and wherein, depending thereon, the lubricant is applied to the conveyor belt of the first container conveyor and/or the second container conveyor by the applicator with dosages varying from one section to a next section.

14. The lubrication method of claim 12, wherein if it is determined by the control unit on the basis of the at least one friction coefficient that lubrication of the first and/or second container conveyor will be necessary, further determining by the control unit when the lubrication of the first and/or second container conveyor will be necessary on the basis of the friction coefficient.

15. The lubrication method of claim 11, wherein the controllable articulated arm is connected at its base to a box-like structure, wherein the floor-supported undercarriage is arranged on a lower end of the box-like structure.

16. The lubrication method according to claim 10, wherein the lubricant is a dry lubricant.

17. The lubrication method of claim 10, wherein the floor-supported undercarriage of the mobile robot is steerable, so that it can move along curved paths of movement on a floor.

18. The lubrication method of claim 10, wherein the floor-supported undercarriage includes wheels, rollers, track and/or crawler chains.

* * * * *